US008484201B2

(12) United States Patent  
Li et al.

(10) Patent No.: US 8,484,201 B2  
(45) Date of Patent: Jul. 9, 2013

(54) COMPARATIVE ENTITY MINING

(75) Inventors: Shasha Li, Beijing (CN); Chin-Yew Lin, Beijing (CN); Youngin Song, Beijing (CN)

(73) Assignee: Microsoft Corporation, Redmond, WA (US)

( * ) Notice: Subject to any disclaimer, the term of this patent is extended or adjusted under 35 U.S.C. 154(b) by 177 days.

(21) Appl. No.: 12/796,335

(22) Filed: Jun. 8, 2010

(65) Prior Publication Data

US 2011/0302157 A1   Dec. 8, 2011

(51) Int. Cl.
*G06F 17/30* (2006.01)

(52) U.S. Cl.
USPC ............................................. 707/723

(58) Field of Classification Search
None
See application file for complete search history.

(56) References Cited

U.S. PATENT DOCUMENTS

| | | | |
|---|---|---|---|
| 6,675,159 B1 | 1/2004 | Lin et al. | |
| 7,620,628 B2 | 11/2009 | Kapur et al. | |
| 7,630,978 B2 | 12/2009 | Li et al. | |
| 7,680,703 B1* | 3/2010 | Smith | 705/26.8 |
| 2003/0144899 A1* | 7/2003 | Kokubo | 705/10 |
| 2004/0049499 A1 | 3/2004 | Nomoto et al. | |
| 2005/0266387 A1* | 12/2005 | Rossides | 434/323 |
| 2009/0063472 A1 | 3/2009 | Pell et al. | |
| 2009/0198644 A1 | 8/2009 | Buchner et al. | |
| 2009/0253112 A1 | 10/2009 | Cao et al. | |
| 2010/0063795 A1* | 3/2010 | Sakao et al. | 704/9 |

OTHER PUBLICATIONS

Murthy Ganapathibhotla and Bing Liu "Mining Opinions in Comparative Sentences", pp. 241-248, Manchester, Aug. 2008.*
Cao, et al., "Recommending Questions Using the MDL-based Tree Cut Model", Retrieved at << http://www2008.org/papers/pdf/p81-cao.pdf >>, International World Wide Web Conference, Proceeding of the 17th international conference on World Wide Web, Apr. 21-25, 2008, pp. 81-90.
Zhang, et al., "Mining Search Engine Query Logs for Query Recommendation", Retrieved at << http://webmining.spd.louisville.edu/Websites/PAPERS/conference/Mining-Search-Query-Logs-for-Recommendations-Zhang-Nasraoui-WWW06.pdf >>, International World Wide Web Conference, Proceedings of the 15th international conference on World Wide Web, May 22-26, 2006, pp. 2.
Huang, et al., "Relevant Term Suggestion in Interactive Web Search Based on Contextual Information in Query Session Logs", Retrieved at << http://citeseerx.ist.psu.edu/viewdoc/download?doi=10.1.1.105.5584&rep=rep1&type=pdf >>, Journal of the American Society for Information Science and Technology, vol. 54, No. 7, May 2003, pp. 638-649.
Tomuro, Noriko., "Interrogative Reformulation Patterns and Acquisition of Question Paraphrases", Retrieved at << http://acl.ldc.upenn.edu/acl2003/iwp/pdfs/Tomuro.pdf >>, Annual Meeting of the ACL, Proceedings of the second international workshop on Paraphrasing, vol. 16, Jul. 11, 2003, pp. 8.

(Continued)

*Primary Examiner* — Bai D. Vu
(74) *Attorney, Agent, or Firm* — Microsoft Corporation

(57) ABSTRACT

One or more techniques and systems are disclosed for generating comparative patterns for use in identifying comparators. A set of comparator pairs is extracted from a first comparative pattern in a pattern database that comprises one or more comparative patterns. Questions are retrieved from a question collection using respective comparator pairs to generate comparative questions. Potential comparative patterns are generated from a combination of the comparator pairs and comparative questions, and the potential comparative patterns are evaluated by determining their reliability, in order to generate second comparative patterns for the pattern database.

20 Claims, 7 Drawing Sheets

OTHER PUBLICATIONS

Califf, et al., "Relational Learning of Pattern-match Rules for Information Extraction", Retrieved at << http://acl.ldc.upenn.edu/W/W97/W97-1002.pdf >>, Proceedings of the sixteenth national conference on Artificial intelligence and the eleventh Innovative applications of artificial intelligence conference innovative applications of artificial intelligence, Jul. 18-22, 1999, pp. 9-15.

Cardie, Claire., "Empirical Methods in Information Extraction", Retrieved at << http://citeseerx.ist.psu.edu/viewdoc/download?doi=10.1.1.20.8120&rep=rep1&type=pdf>>, AI magazine, vol. 18, 1997, pp. 1-17.

Haveliwala, Taher H., "Topic-sensitive Pagerank", Retrieved at << http://www-cs-students.stanford.edu/~taherh/papers/topic-sensitive-pagerank.pdf >>, International World Wide Web Conference, Proceedings of the 11th international conference on World Wide Web, May 7-11, 2002, pp. 10.

Jeh, et al., "Scaling Personalized Web Search", Retrieved at << http://infolab.stanford.edu/~glenj/spws.pdf >>, International World Wide Web Conference, Proceedings of the 12th international conference on World Wide Web, May 20-24, 2003, pp. 1-35.

Jindal, et al., "Identifying Comparative Sentences in Text Documents", Retrieved at << http://citeseerx.ist.psu.edu/viewdoc/download?doi=10.1.1.63.6127&rep=rep1&type=pdf >>, Annual ACM Conference on Research and Development in Information Retrieval, Proceedings of the 29th annual international ACM SIGIR conference on Research and development in information retrieval, Aug. 6-11, 2006, pp. 8.

Jindal, et al., "Mining Comparative Sentences and Relations", Retrieved at << http://citeseerx.ist.psu.edu/viewdoc/download?doi=10.1.1.80.1219&rep=rep1&type=pdf >>, Proceedings The Twenty-First National Conference on Artificial Intelligence and the Eighteenth Innovative Applications of Artificial Intelligence Conference, Jul. 16-20, 2006, pp. 6.

Kozareva, et al., "Semantic Class Learning from the Web with Hyponym Pattern Linkage Graphs", Retrieved at <<http://www.aclweb.org/anthology-new/P/P08/P08-1119.pdf >>, In Proceedings of Association for Computational Linguistics, ACL, Jun. 2008, pp. 1048-1056.

Linden, et al., "Amazon.com Recommendations: Item-to-item Collaborative Filtering", Retrieved at << http://www.win.tue.nl/~laroyo/2L340/resources/Amazon-Recommendations.pdf >>, IEEE Internet Computing, vol. 7, No. 1, Jan. / Feb. 2003, pp. 5.

Mooney, et al., "Mining Knowledge from Text using Information Extraction", Retrieved at << http://citeseerx.ist.psu.edu/viewdoc/download?doi=10.1.1.80.4183&rep=rep1&type=pdf >>, ACM SIGKDD Explorations Newsletter, Natural language processing and text mining, vol. 7, No. 1, Jun. 2005, pp. 3-10.

Radev, et al., "Probabilistic Question Answering on the Web", Retrieved at << http://filebox.vt.edu/users/wfan/paper/www/www.pdf >>, International World Wide Web Conference, Proceedings of the 11th international conference on World Wide Web, May 7-11, 2002, pp. 12.

Ravichandran, et al., "Learning Surface Text Patterns for a Question Answering System", Retrieved at << http://www.isi.edu/natural-language/projects/webclopedia/pubs/02ACL-patterns.pdf >>, Annual Meeting of the ACL, Proceedings of the 40th Annual Meeting on Association for Computational Linguistics, Jul. 7-12, 2002, pp. 7.

Riloff, et al., "Learning Dictionaries for Information Extraction by Multi-level Boot-strapping", Retrieved at << http://reference.kfupm.edu.sa/content/l/e/learning_dictionaries_for_information_ex_2607.pdf >>, Proceedings of the sixteenth national conference on Artificial intelligence and the eleventh Innovative applications of artificial intelligence conference innovative applications of artificial intelligence, Jul. 18-22, 1999, pp. 6.

Riloff, Ellen., "Automatically Generating Extraction Patterns from Untagged Text", Retrieved at << http://citeseerx.ist.psu.edu/viewdoc/download?doi=10.1.1.26.6589&rep=rep1&type=pdf >>, In AAAI/IAAI, vol. 2, 1996, pp. 4.

Soderland, Stephen., "Learning Information Extraction Rules for Semi-structured and Free Text", Retrieved at << http://www.springerlink.com/content/m23n8197vg924t51/fulltext.pdf >>, Machine Learning, Special issue on natural language learning, vol. 34, No. 1-3, Feb. 1999, pp. 233-272.

Dan Gusfield, 1997, Algorithms on strings, trees, and sequences: computer science and computational biology, Cambridge University Press, New York, NY, USA.

Bing Liu, 2006, Web Data Mining. Springer, 2006.

* cited by examiner

COMPARATIVE ENTITY MINING

BACKGROUND

Comparing alternative options can be an important act in decision-making that people often perform. For example, if someone is interested in certain products, such as digital cameras, they may want to know about some alternatives, and be able compare different cameras before making a purchase. This type of comparison activity is commonly used, but may need a lot of knowledge. Magazines, such as consumer-based periodicals, and online media often providing editorial comparison content and surveys to satisfy this need. In an online environment, comparison activity typically involves searches for relevant web pages containing information about the targeted products, find competing products, read reviews, and identify pros and cons.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Generally, it can be difficult to decide if two entities (e.g., items, products, people, companies) are comparable or not, as people do compare apples and oranges for various reasons. For example, "Ford" and "BMW" might be comparable as "car manufacturers" or as "market segments that their products are targeting," but rarely do people compare "Ford Focus" and "BMW 328i" even though they are both car models because, among other things, they have significantly different price points. Further, when an entity has several functionalities, such as portable media players, mobile phones, and cameras, it may be difficult to decide which functionalities to compare (e.g., a mobile phone can be a portable media player, phone, and camera).

Currently, recommender systems and techniques mainly rely on similarities between items and/or their statistical correlations in user log data. For example, online retailers often recommend products to its customers based on their own purchase histories, similar customers' purchase histories, and similarity between products. However, recommending an item is not equivalent to finding a comparable item. In these examples, a purpose of recommendation is to entice their customers to add more items to their shopping carts by suggesting similar or related items. However, when comparing items a user may wish to explore alternatives, for example, helping them make a decision among comparable items.

One or more techniques and/or systems are disclosed herein that can help address this difficulty, by mining comparable entities from comparative questions in a collection of questions (e.g., that users posted on-line). For example, a weakly-supervised bootstrapping method can be used to identify comparative questions, comparative patterns, and extract comparable entities. The comparable entities (comparators) can be used to help users make alternate decisions by comparing relevant comparators, instead of providing merely recommendation, as is currently provided.

In one embodiment for generating comparative patterns for use in identifying comparators, a set of comparator pairs can be extracted from a first comparative pattern, such as a seed pattern (e.g., having defined characteristics) in a pattern database that comprises one or more comparative patterns. Questions can be retrieved from a question collection (e.g., online database of user submitted questions) using respective comparator pairs to generate comparative questions (e.g., those that compare entities). Potential comparative patterns can be generated from a combination of the comparator pairs and comparative questions, and the potential comparative patterns can be evaluated by determining their reliability, in order to generate second comparative patterns for the pattern database. As an example, the sequence can be iterated to generate more comparative patterns that may be used to extract comparators from comparative questions.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
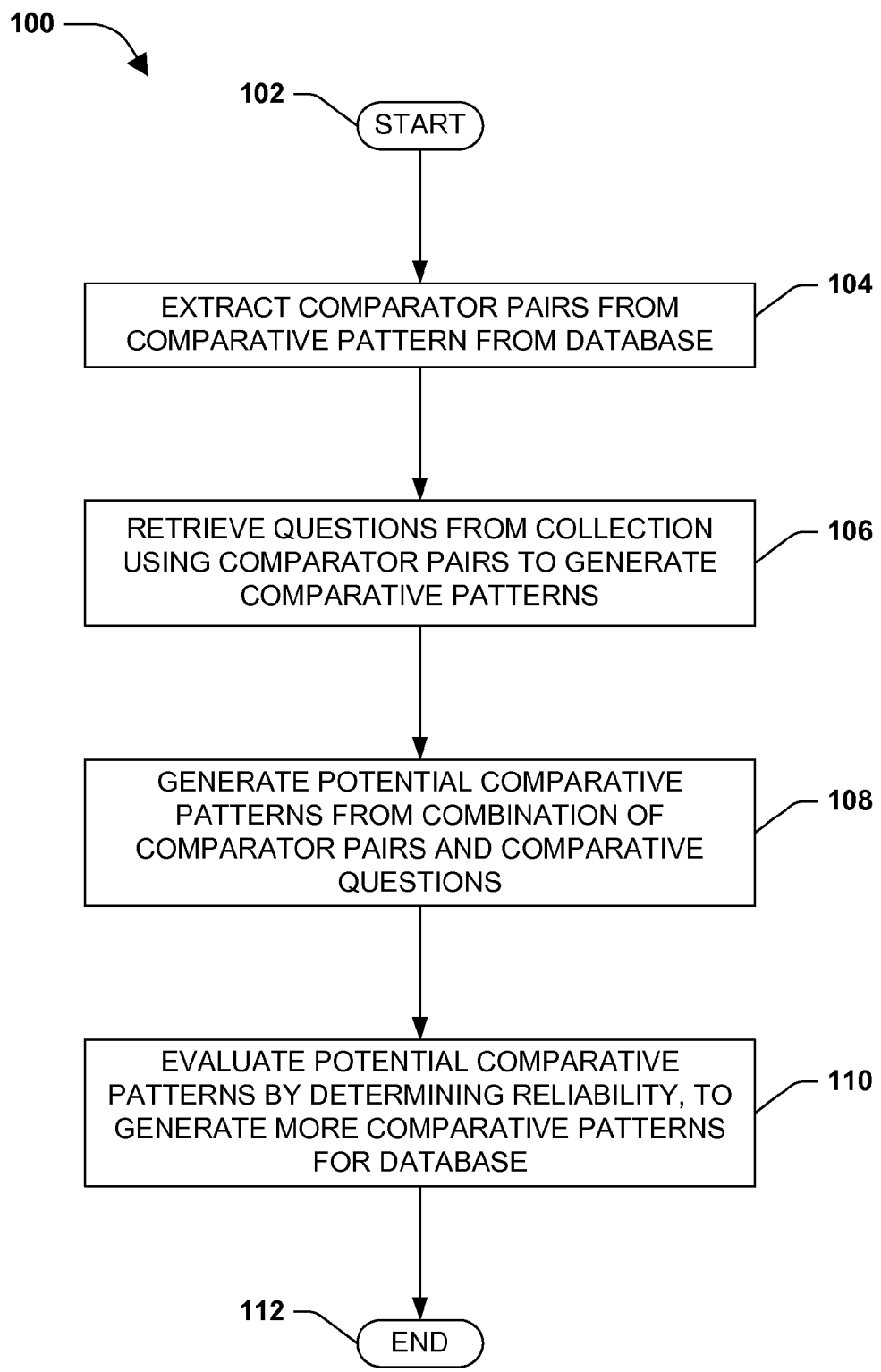
FIG. 1 is a flow diagram of an exemplary method for generating comparative patterns for use in identifying comparators.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 for generating comparative patterns for use in identifying comparators. The exemplary method 100 begins at 102 and involves extracting a set of comparator pairs from a first comparative pattern in a pattern database that comprises one or more comparative patterns, at 104. For example, a comparator may be an entity (e.g., object, item, thing, person, company, etc.) which is a target of comparison in a comparative question, such as: "what's better, brick siding or vinyl siding?" In this question the comparators are "brick siding" and "vinyl siding," for example.

In one embodiment, a comparative question may be described as a question that intends to compare two or more entities (e.g., comparators) while comprising these entities in the question. Additionally, in one embodiment, the comparative pattern can be described as a sequence pattern (e.g., a sequence of words, tags, and/or symbols denoting parts of a question) that can be used to identify a comparative question and extract the comparators comprised therein.

Therefore, in one embodiment, a pattern database may comprise an initial comparative pattern that can be used to initiate a process for generating comparative patterns, such as by seeding the pattern database. In this embodiment, the initial comparative pattern can comprise a defined pattern, for example, defined by a user/administrator attempting to generate comparative patterns, or automatically generated (e.g., programmatically) to initiate the process. As an example, the defined pattern can comprise known comparators in a known sequence that designed to provide reliable results for identifying comparative questions.

At 106 in the exemplary method 100, questions are retrieved from a question collection using the respective comparator pairs in order to generate comparative questions. For example, a set of initial seed comparator pairs are extracted from the first comparative pattern (e.g., or a plurality of seed comparative patterns), and for comparator pairs, questions that contain the pair are retrieved from a question collection. In this example, the retrieved question can be regarded as comparative questions.

In one embodiment, the question collection may comprise questions mined from the Internet. For example, there are a plurality of websites dedicated to providing a forum for users to ask questions and receive answers (e.g., Yahoo answers). As another example, there are a plurality of product review sites, customer review sites, and general forums where people ask questions and people (e.g., other users or administrators of the site) answer the questions. These sites may be a good resource for finding comparative questions.

In this embodiment, for example, questions that comprise the comparator pair, such as "vinyl" and "brick," can be retrieved from the Internet-based question collection. These questions may then be considered as comparative questions, in this example. It will be noted that other question collections may be provided, and the techniques and systems described herein are not limited to the above listed embodiments. For example, an enterprise may compile a database that comprises questions, such as from questions asked by customers to the enterprise.

At 108 is the exemplary embodiment 100, potential comparative patterns are generated from a combination of the comparator pairs, extracted from the comparative pattern(s), and comparative questions retrieved from the question collection. In one embodiment, a sequential pattern can be defined as a sequence $S(s_1 s_2 \ldots s_i \ldots s_n)$ where $s_i$ can be a word, a part-of-speech (POS) tag, or a symbol, for example, denoting either a comparator ($C), or a beginning (#start) or an end of a question (#end). As an example, a potential comparative pattern is generated by constructing a sequential pattern from a comparative question and a comparator pair.

In one embodiment, generating potential comparative patterns comprises applying sequential pattern mining to a combination of a comparative question and a comparator pair. As an example, a surface text pattern mining technique may be applied to generate potential comparative patterns. In one embodiment, comparators in a combination of a comparative question and a comparator pair can be replaced with comparator symbols ($C). Further, a start (#start) and end (#end) symbol can be attached to the combination of the comparator symbols to generate a question sequence. Additionally, sequential patterns can be generated from the question sequence, where the sequential patterns comprise potential comparative patterns.

As described above, a sequential pattern may be a comparative pattern (e.g., an indicative extraction pattern (IEP)) if it can be used to reliably identify comparative questions and extract comparators, for example. At 110 in the exemplary method 100, the potential comparative patterns are evaluated by determining their reliability, thereby generating a set of second comparative patterns for the pattern database. In one embodiment, a reliability score can be generated for a potential comparative pattern, and the reliability score can be compared to a desired comparative pattern threshold.

For example, an equation may be applied to a pattern that determines how reliably the potential comparative pattern extracts comparators from a comparative question. Further, the equation for determining reliability can be derived from an assumption that if a sequential pattern can be used to extract many reliable comparator pairs, it is very likely a comparative pattern. In one embodiment, the comparative pattern threshold may be determined empirically, such as by experimentation that yields desirable results (e.g., desirable for a user).

Having generated a set of second comparative patterns for the pattern database, the exemplary method 100 ends at 112.

Figure 2:
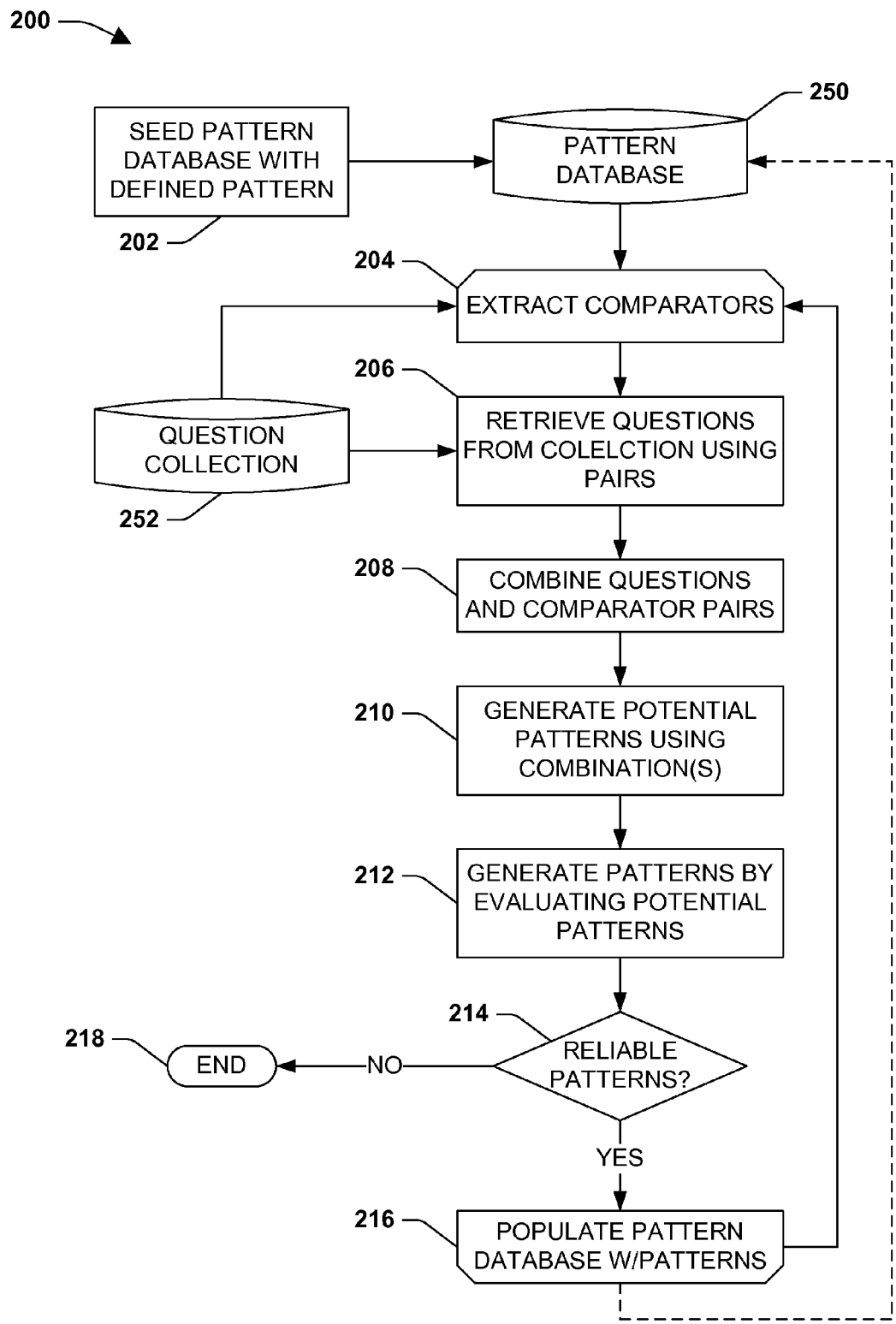
FIG. 2 is a flow diagram illustrating an exemplary embodiment where a comparative pattern database can be populated in an iterative process.

In one aspect, generating comparative patterns, such as to be used to extract comparators for search purposes, can be an iterative process. That is, for example, populating a comparative pattern database can be started with a single defined comparative pattern, and the iterative process can be a bootstrap way to generate a plurality of comparative patterns, which may later be used to generate a comparator database. FIG. 2 is a flow diagram illustrating an exemplary embodiment 200 where a comparative pattern database can be populated in an iterative process.

At 202, the comparative pattern database 250 is seeded with a defined comparative pattern. As described above, the defined comparative pattern can comprise a sequential pattern that has a defined reliability to extract comparators from comparative questions. At 204, the iterative comparative process generation process begins with extracting the comparators using the seed comparative pattern. For example, the seed pattern can be applied to the question collection 252, such as an Internet-based database of questions, to extract a set of seed comparators.

For example, a seed comparative pattern may be a simple question, such as "C$ or C$ ?", where the pattern simply attempts to compare one thing to another (e.g., much like a question, such as "brick or vinyl?", which attempts to compare the two). In this example, the seed comparative pattern can be applied to the question collection 252 to identify those questions that are comprised of this pattern (e.g., brick or vinyl, Ford or Chrysler, window seat or aisle seat, etc.). From the questions that comprise the seed comparative pattern, the comparators can be extracted, for example, to get a set of seed comparators (e.g., (brick, vinyl); (Ford, Chrysler); and (window seat, aisle seat)).

At 206 in the exemplary embodiment 200, questions that comprise the comparators are retrieved from the question collection 252 for respective comparator pairs. For example, a plurality of questions may be retrieved for the (brick, vinyl) comparator pair, such as: "which one is better for durability, brick siding or vinyl siding?" and "what is the difference in cost between brick and vinyl siding?"

At 208, the respective questions retrieved for the seed comparators, and the respective comparator pairs can be combined. For example, even if a comparative question was retrieved for a first comparator pair, not only is it combined with the first comparator pair, it can be combined with the respective comparator pairs extracted by the seed comparative pattern. In this way, in this example, a plurality of combinations of questions and comparators is generated.

At 210, potential comparative patterns are generated using the combinations of questions and comparators. As described above, sequential pattern mining can be applied to generate potential comparative patterns. In one embodiment, a sequential pattern can be generated from a question sequence. Further, generating a sequential pattern can comprise generating a lexical pattern. As an example, lexical patterns can indicate sequential patterns that comprise merely words and symbols (e.g., $C, #start, and #end). In one embodiment, lexical patterns can be generated by using a suffix tree algorithm with two constraints: first, a pattern comprises more than one $C; second, the pattern frequency in collection is more than an empirically determined number $\beta$.

In another embodiment, generating a sequential pattern can comprise generating a generalized pattern, such as from lexical patterns. As an example, a lexical pattern may be too specific; therefore, the lexical patterns can be generalized by replacing one or more words with a corresponding POS tags. For example, $2^N-1$ generalized patterns can be produced from a lexical pattern containing N words excluding the $Cs (comparator symbols).

In another embodiment, generating a sequential pattern can comprise generating a specialized pattern, such as from a combination of generalized patterns and lexical patterns. A pattern may be too general, for example, such as "this or that." While a question such as "brick or vinyl?" can be comparative, a pattern generated from the question, "<$C or $C ?>," can be too general. For example, there can be many non-comparative questions matching the pattern, such as "true or false?" Therefore, in this embodiment, pattern specialization can be performed by adding POS tags to respective comparator slots. For example, using the lexical pattern "<$C or $C ?>" and the question "brick or vinyl?", the specialized pattern "<$C/NN or $C/NN?>" can be produced.

Returning to FIG. 2, at 212, the potential comparative patterns are evaluated for reliability to generate comparative patterns. As described above, a reliability score can be generated and compared to a desired threshold to generate comparative patterns. Further, the reliability score can be based on how reliably a comparator pair is extracted by the pattern.

In one embodiment, determining how reliably a comparator pair can be extracted can comprise determining a number of patterns in a set of potential comparative patterns that can extract the comparator pair, then comparing the number of patterns to a desired pattern threshold. In this embodiment, this determination comes from a second assumption that if a comparator pair can be extracted by a comparative pattern, the pair is reliable, along with the above described first assumption that if a sequential pattern can be used to extract many reliable comparator pairs, it is very likely to be a comparative pattern.

In one embodiment, according to the first assumption above, a reliability score $R^k(p_i)$ for a candidate pattern $p_i$ at iteration k can be defined as follows:

$$R^k(p_i) = \frac{\sum_{\forall cp_j \in CP^{k-1}} N_Q(p_i \to cp_j)}{N_Q(p_i \to *)}$$

where Pi can extract known reliable comparator pairs $cp_j$. $CP^{k-1}$ can indicate a reliable comparator pair repository accumulated until a (k−1)th iteration. (x) can represent a number of questions satisfying a condition x. Further, the condition $p_i \to cp_j$ can denote that $cp_j$ can be extracted from a question by applying pattern $p_i$ while the condition $p_i \to *$ can denote respective questions comprising pattern $p_i$.

However, the above equation can suffer from incomplete knowledge about reliable comparator pairs. For example, very few reliable pairs may be generally discovered in an early stage of bootstrapping. In this example, the value of the above equation might be underestimated which can affect an effectiveness of the equation for distinguishing comparative patterns from non-reliable patterns. In one embodiment, this can be mitigated by a look-ahead procedure.

For example, set of candidate patterns at the iteration k can be denoted by $\hat{P}^k$. A support S for comparator pair $\widehat{cp}_i$ which can be extracted by $\hat{P}^k$ and does not exist in a current reliable set, can be defined as:

$$S(\widehat{cp}_i) = N_Q(\hat{P}^k \to \widehat{cp}_i)$$

where $\hat{P}^k \to \widehat{cp}_i$ provides that one of the patterns in $\hat{P}^k$ can extract $\widehat{cp}_i$ in some questions. Therefore, in this example, if $\widehat{cp}_i$ can be extracted by many candidate patterns in $\hat{P}^k$, it may be likely to be extracted as a reliable pattern in a next iteration. Further, based on this assumption in this example, a pair $\widehat{cp}_i$ whose support S is more than a threshold $\alpha$ can be regarded as a likely-reliable pair.

In one embodiment, using this likely-reliable pairs, lookahead reliability score $\hat{R}(p_i)$ can be defined as:

$$\hat{R}^k(p_i) = \frac{\sum_{\forall \hat{cp}_i \in \hat{CP}^k_{rel}} N_Q(p_i \to \hat{cp}_i)}{N_Q(p_i \to *)},$$

where $\widehat{cp}_{i\,rel}^k$ can indicate a set of likely-reliable pairs based on $\hat{P}^k$. In one embodiment, by interpolating the above equations, a final reliability score $R(p_i)_{final}^k$ for a pattern can be defined as:

$$R(p_i)_{final}^k = \lambda \cdot R^k(p_i) + (1-\lambda) \cdot \hat{R}^k(p_i)$$

In this embodiment, using the above combined equation, respective potential, comparative patterns can be evaluated, and can select those patterns whose score is more than a desired threshold $\gamma$ as comparative patterns. As described above, desired thresholds can be determined empirically, such as by observing experimental results.

At 214 of the exemplary embodiment 200, if it determined that there are one or more reliable patterns (e.g., potential comparative patterns that meet the desired threshold), these comparative patterns can be populated into the comparative pattern database 250, at 216. As illustrated in the exemplary embodiment 200, the process 204-216 can be iterated until no more reliable patterns are found, at 214. If no more reliable patterns are identified, at 214, the exemplary embodiment 200 ends at 218.

In this example, by iterating the process, the comparative pattern database can be populated with a plurality of comparative patterns, for example, by merely starting with a single defined comparative pattern. Therefore, in one embodiment, the second comparative patterns generated can be used to extract a second set of comparators to generate a third set of comparative patterns. Further, in one embodiment, the second comparative patterns can be used to extract a second set of comparators, by applying the second comparative patterns to an Internet-based collection of questions to identify the second set of comparators.

In one embodiment, a comparator pair database can be constructed by applying the comparative patterns in the pattern database to a question collection to extract comparator pairs, where the comparator pairs comprise at least two items that are compared to each other. Further, the comparators in the database can be ranked by how often they are compared with each other, as determined by the questions in the collection.

Figure 3:
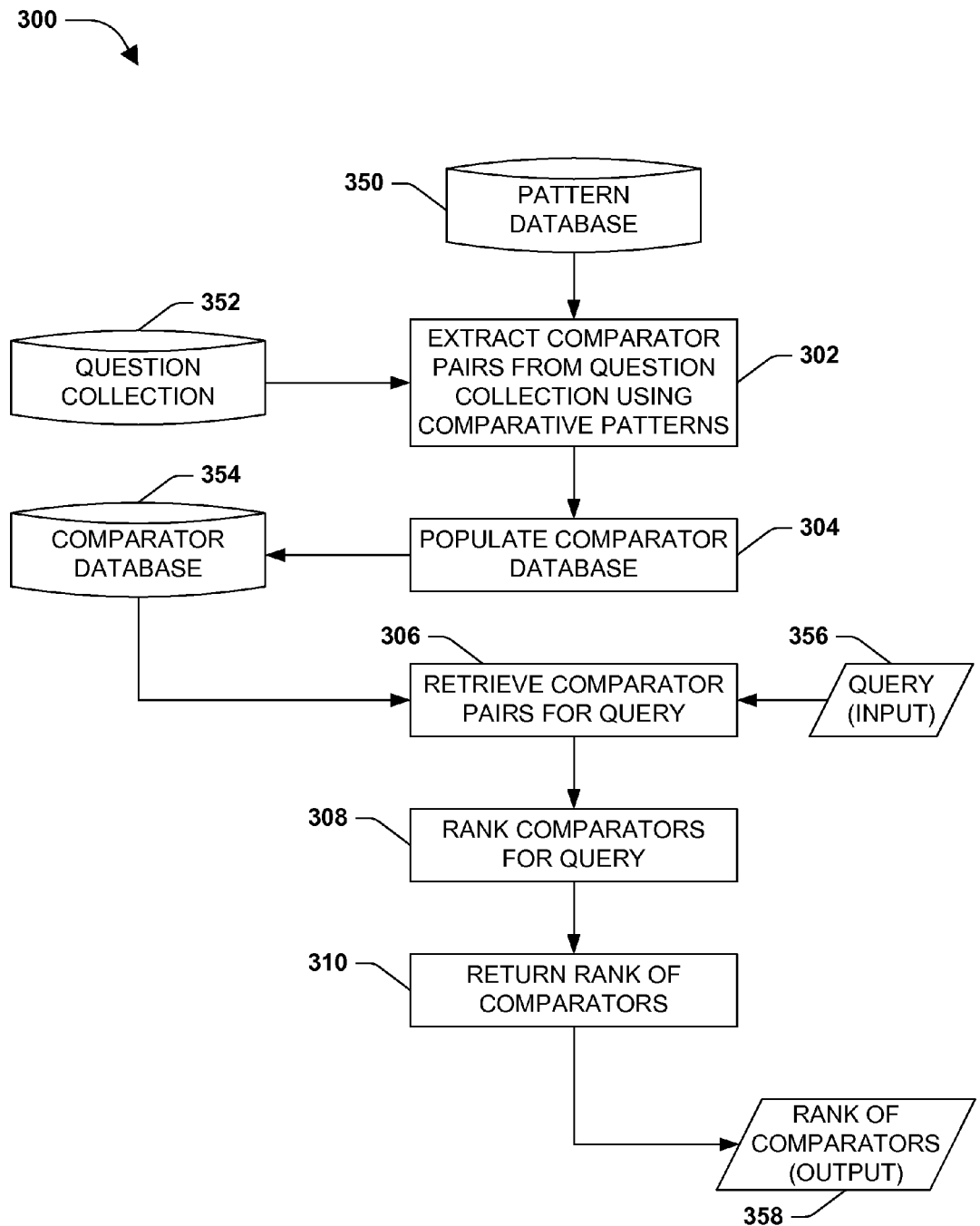
FIG. 3 is a flow diagram illustrating an example embodiment where a comparator database is generated and used to rank comparators.

FIG. 3 is a flow diagram illustrating an example embodiment 300 where a comparator database is generated and used to rank comparators. At 302, comparator pairs are extracted from comparative questions in the question collection 352, using the comparative patterns from the comparative pattern database 350 (e.g., as created in FIG. 2 by the bootstrapping process). For example, the question collection 352, such as questions compiled from the Internet, can be searched for comparative questions that match the comparative patterns. Using the comparative patterns, comparators (e.g., pairs, such as "gas, electric") can be extracted from the comparative questions.

At 304, the extracted comparators can be used to populate the comparator database 354. In one embodiment, a determination can be made that identifies how many times a first comparator is compared with a second comparator. For example, a first brand may be compared with a second brand very often, as they are most popular; while a third brand may be compared with the first brand item less often, as it is less popular. As another example, people searching for cars may compare gas cars to electric cars, but they may also compare gas cars to hybrid, or electric cars to hybrid cars. In this embodiment, a number of times the second comparator is compared with the first comparator can be determined using the application of the comparative patterns in the pattern database to the question collection.

At 306 in the exemplary embodiment 300, a comparator pair is retrieved for a query 356, such as by a user. As an example, a query may comprise a user selecting a first entity (e.g., Lebron James), and the retrieved comparator may comprise a second entity that is paired in the comparator database 354 (e.g., Kobe Bryant). In this way, for example, suggested comparators can be provided to a user based on the pairs in the database.

At 308, a plurality of comparators may be provided, for example, and the comparators can be ranked for the query. In one embodiment, a plurality of second comparators that are paired with a first comparator in the comparator pair database can be ranked, where the ranking comprising a number of times the second comparator is compared with the first comparator. For example, based on the comparative questions in the question collection, the number of times a pair of comparators show up in a question together can determine a ranking for one of the comparators when applied to the other.

As an example, the term "Dior" may be compared with "Louis Vuitton," "Coach," "Gucci," and "Prada." However, the respective comparators may be compared with "Dior" a different number of times in the question collection. Therefore, the number of time compared can be used to rank the comparators, for example.

In the exemplary method 300, at 310, the ranking of comparators for the queried item can be returned as output 358. For example, a user may input a query 356 at a website for a type of camera, and an output 358 can comprise a list of comparable cameras, ranked in order of comparison.

Figure 4:
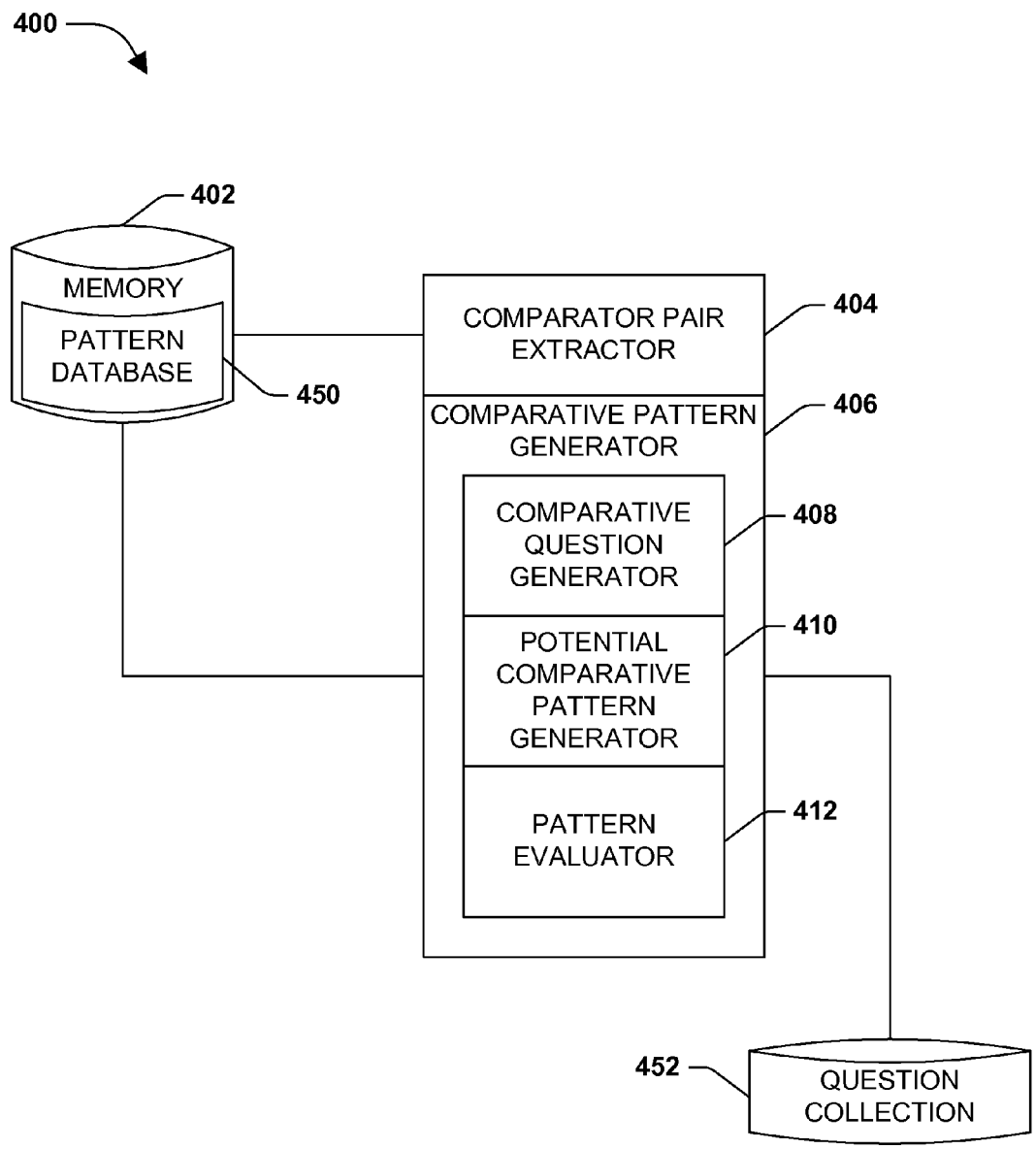
FIG. 4 is a component diagram of an exemplary system for generating comparative patterns for use in identifying comparators.

A system may be devised that can be used to identify comparative question and extract comparable entities, such as items that may be compared to each other by a user (e.g., different brands of a type of camera). FIG. 4 is a component diagram of an exemplary system 400 for generating comparative patterns for use in identifying comparators. A memory component 402 stores a pattern database 450 comprising comparative patterns, such as generated by the exemplary system 400. A comparator pair extraction component 404 is operably coupled with the memory component 402, and is used to extract a set of comparator pairs from a comparative pattern in the pattern database 450.

A comparative pattern generation component 406 is operably coupled with the memory component 402, and generates comparative patterns to be stored in the pattern database 450. The comparative pattern generation component 406 comprises a comparative question generation component 408 that retrieves questions from a collection of questions 452 using comparator pairs, such as those extracted by the comparator pair extraction component 404, in order to generate comparative questions.

The comparative pattern generation component 406 further comprises a potential comparative pattern generation component 410 that generates potential comparative patterns from a combination of the comparator pairs and comparative questions, such as those retrieved by the comparative question generation component 408. The comparative pattern generation component 406 also comprises a pattern evaluation component 412 that evaluates the potential comparative patterns from the potential comparative pattern generation component 410 to generate comparative patterns for the pattern database 450.

Figure 5:
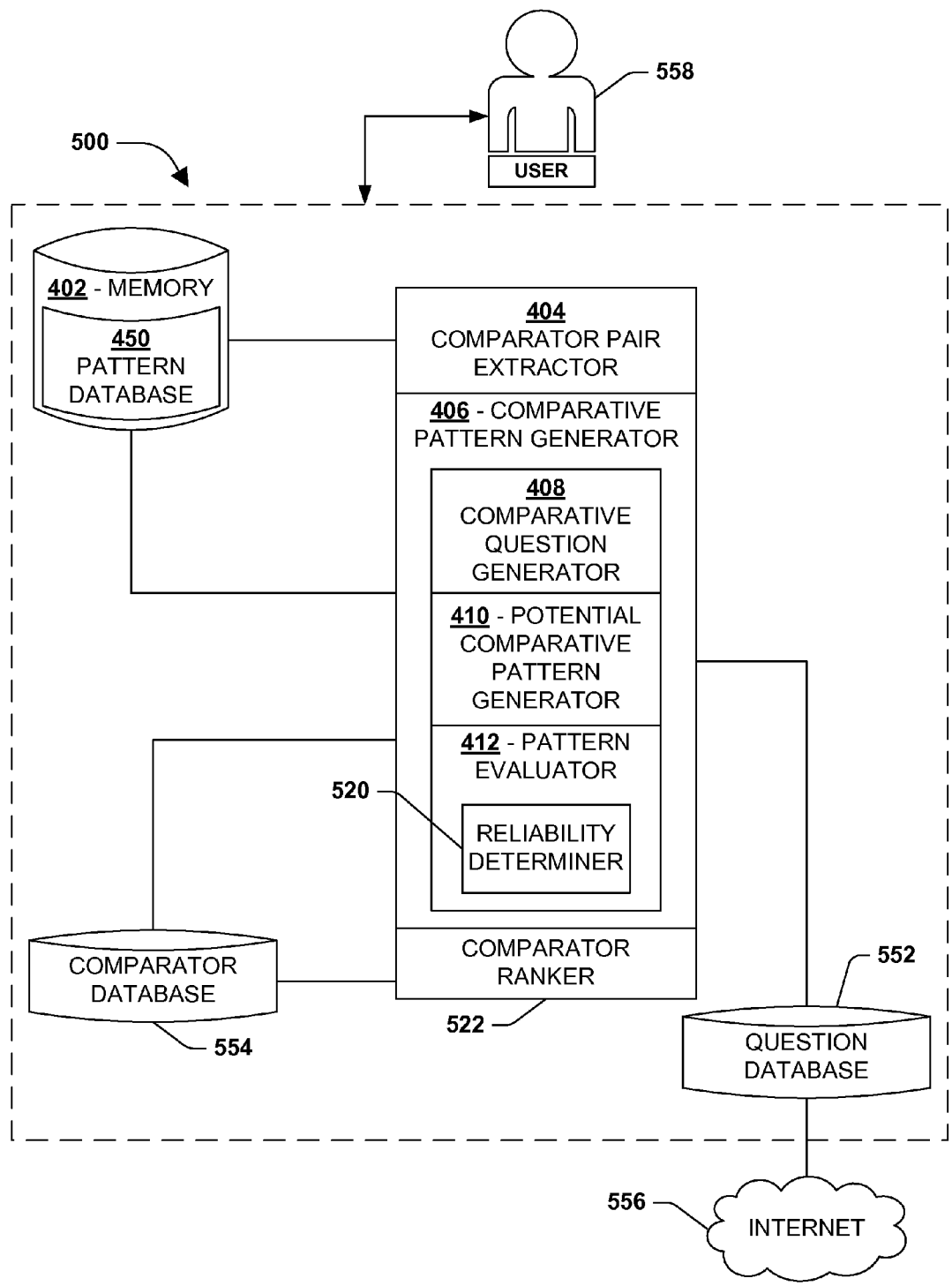
FIG. 5 is a component diagram illustrating an embodiment where one or more systems and/or techniques described herein may be implemented.

FIG. 5 is a component diagram illustrating one embodiment 500 where one or more systems and/or techniques described herein may be implemented. In this embodiment, the collection of questions comprised in a question database 552 may be derived from questions retrieved from an Internet-based 556 collection of questions. For example, the question database 552 may be populated by one or more websites that solicit Internet-user questions, such as online answer sites, customer service sites, product review sites, and more.

The pattern evaluation component 412 can comprise a reliability determination component 520 that generates a reliability score for a potential comparative pattern, and then compares the reliability score to a desired comparative pattern threshold. For example, when populating the pattern database 450 with comparative patterns, the potential comparative patterns generated by the potential comparative pattern generation component 410 can be evaluated for reliability to generate comparators. The reliability score calculated by the reliability determination component 520, for example, may be a representation of the pattern's ability to reliably generate comparators for a comparator database 554.

The comparator pair database 554 can be populated by applying the comparative patterns in the pattern database 450 to the collection of questions from the question database 552, in order to extract comparator pairs. In this embodiment, the comparator pairs can comprise at least two items that are compared to each other, such as "peanuts" and "cashews." A comparator ranking component 522 can rank a plurality of second comparators that are paired with a first comparator in a comparator pair database 554. In this embodiment, the ranking can comprise a number of times the second comparator is compared with the first comparator, such as in questions from the question database 552.

In one embodiment, a user 558 may input a query that comprises a single entity, such as an item, person, or company, for example. In this example, the comparators that are paired with the entity of the user's query in the comparator database 554 can be retrieved, and the comparator ranker can apply a comparison rank to respective retrieved comparators for the query entity. In this embodiment, a list of one or more comparators (e.g., entities that are comparable to the query entity) can be returned to the user, such as in a display. In this way, the user may see a list of items that can be compared with their query entity, such as when shopping for a product (e.g., looking for a particular camera, returns a list of comparable cameras for the user to compare).

Figure 6:
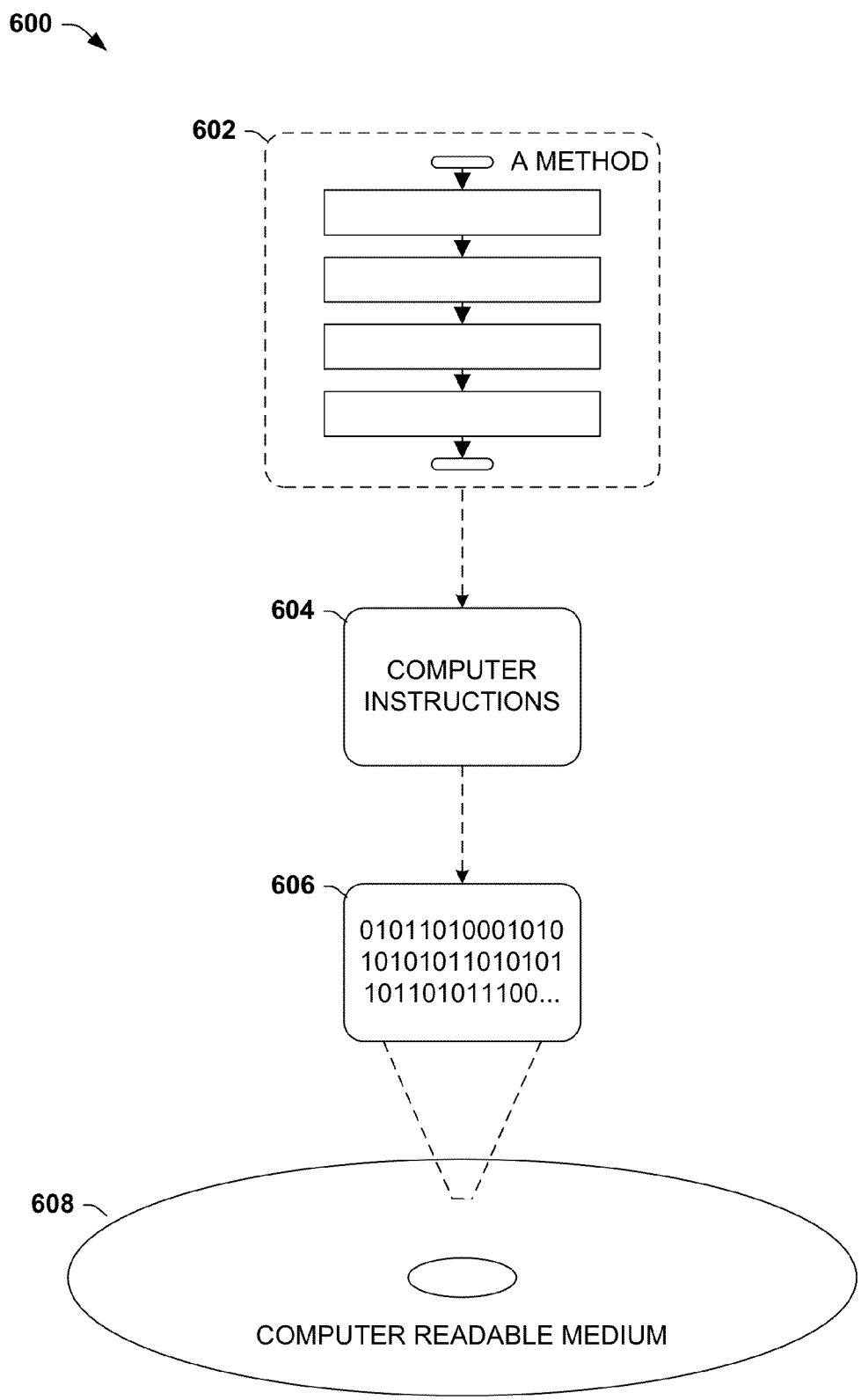
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as the exemplary method 100 of FIG. 1, for example. In another such embodiment, the processor-executable instructions 604 may be configured to implement a system, such as the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component;" "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
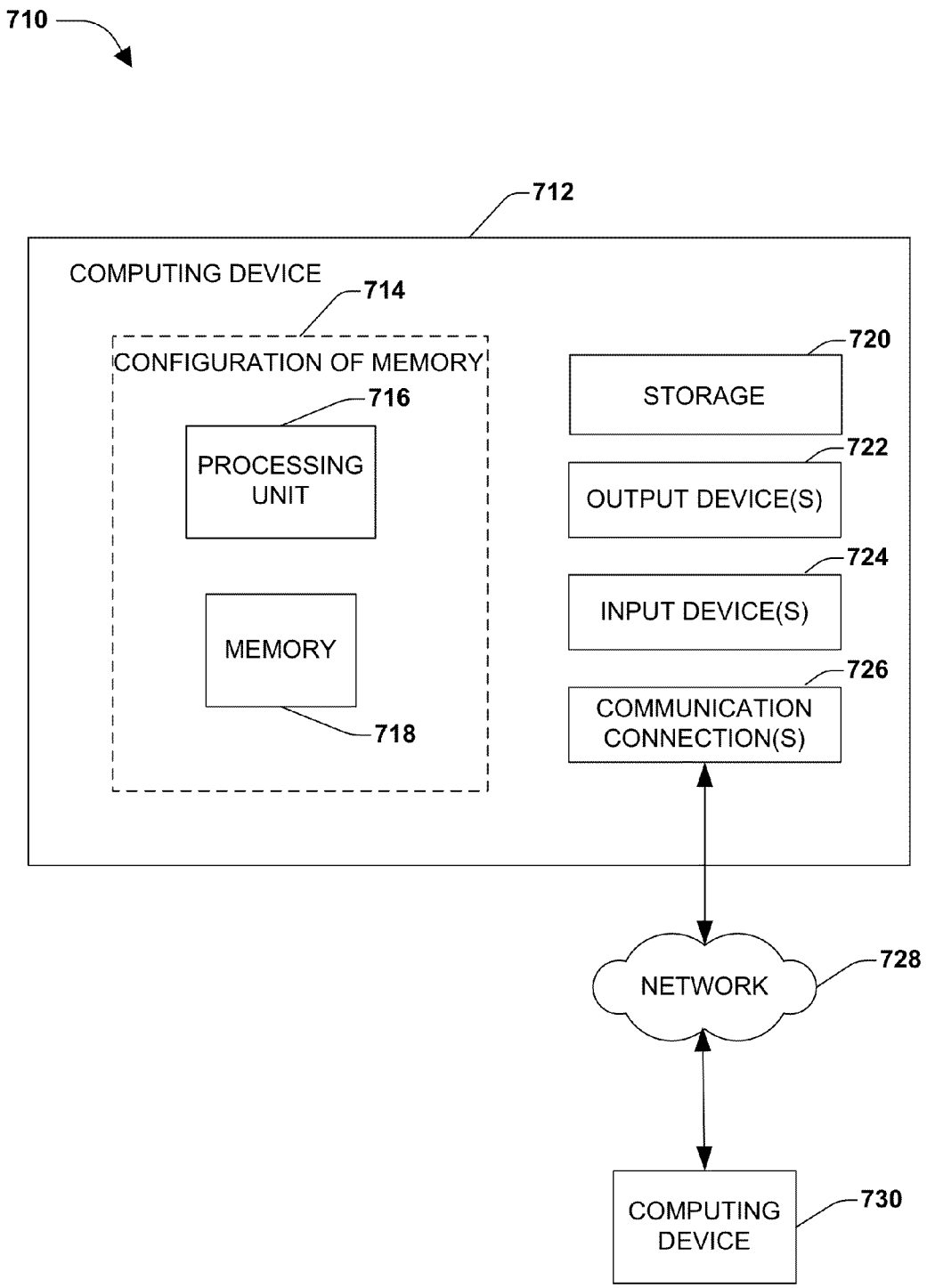
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   receiving a comparator pair comprising a first comparator and a second comparator;
   retrieving a comparative question comprising a comparison of the first comparator and the second comparator;
   determining a comparative pattern based upon the comparative question; and
   evaluating the comparative pattern based upon a determined reliability of the comparative pattern in extracting one or more comparators from one or more comparative questions.

2. The method of claim 1, the comparative pattern comprising a sequential pattern.

3. The method of claim 1, the retrieving comprising retrieving the comparative question from a database comprising a plurality of questions.

4. The method of claim 1, the evaluating comprising determining a reliability score for the comparative pattern.

5. The method of claim 3, comprising accessing the database via the Internet.

6. The method of claim 1, the evaluating comprising determining whether a performance of the comparative pattern meets a threshold.

7. A computer readable medium comprising instructions that when executed perform a method comprising:
   receiving an input;
   identifying a first comparator pair comprising the input and a first comparator;
   identifying a second comparator pair comprising the input and a second comparator; and ranking the first comparator pair against the second comparator pair.

8. The computer readable medium of claim 7, the ranking comprising ranking based upon a comparison of:
a first number of questions that respectively comprise the input and the first comparator; and
a second number of questions that respectively comprise the input and the second comparator.

9. The computer readable medium of claim 7, the ranking comprising ranking based upon a comparison of:
a first number of questions that respectively comprise the first comparator; and
a second number of questions that respectively comprise the second comparator.

10. The computer readable medium of claim 7, at least one of the identifying the first comparator pair or the identifying the second comparator pair performed using a comparative pattern.

11. The computer readable medium of claim 7, the first comparator pair comprised in a first question, the second comparator pair comprised in a second question.

12. The computer readable medium of claim 11, comprising receiving the first question and the second question from a database via the Internet.

13. A system, comprising:
a component configured to receive an input;
an identification component configured to identify, based upon the input, a first question and a second question different than the first question;
an extraction component configured to extract:
a first comparator pair comprised in the first question and comprising the input and a first comparator; and
a second comparator pair comprised in the second question and comprising the input and a second comparator; and
a ranking component configured to rank the first comparator pair against the second comparator pair.

14. The system of claim 13, the identification component configured to perform the identifying using a comparative pattern.

15. The system of claim 13, the extraction component configured to perform the extraction using a comparative pattern.

16. The system of claim 13, the identification component configured to perform the identifying and the extraction component configured to perform the extracting using a same comparative pattern.

17. The system of claim 13, the ranking component configured to perform the ranking based upon a comparison of:
a first number of questions that respectively comprise the input and the first comparator; and
a second number of questions that respectively comprise the input and the second comparator.

18. The system of claim 13, the ranking component configured to perform the ranking based upon a comparison of:
a first number of questions that respectively comprise the first comparator; and
a second number of questions that respectively comprise the second comparator.

19. The system of claim 14, the comparative pattern comprising a sequential pattern.

20. The system of claim 13, comprising a question receiving component configured to receive the first question and the second question via the Internet.

* * * * *

UNITED STATES PATENT AND TRADEMARK OFFICE
CERTIFICATE OF CORRECTION

| | | |
|---|---|---|
| PATENT NO. | : 8,484,201 B2 | Page 1 of 1 |
| APPLICATION NO. | : 12/796335 | |
| DATED | : July 9, 2013 | |
| INVENTOR(S) | : Li et al. | |

It is certified that error appears in the above-identified patent and that said Letters Patent is hereby corrected as shown below:

In the Drawings

Sheet 2 of 7, Fig. 2, Reference Numeral 206, line 2, delete "COLELCTION" and insert -- COLLECTION --, therefor.

In the Specification

Column 6, line 11, delete "P$i$" and insert -- P$i$ --, therefor.

Column 6, line 51, delete " $\widehat{Cp}_{l\,rel}^{\;\;k}$ " and insert -- $\widehat{CP}_{rel}^{k}$ --, therefor.

Signed and Sealed this
Tenth Day of February, 2015

Michelle K. Lee
*Deputy Director of the United States Patent and Trademark Office*